(12) United States Patent
Chen

(10) Patent No.: US 6,239,221 B1
(45) Date of Patent: May 29, 2001

(54) LOW GLOSS WEATHERABLE POLYMER COMPOSITION

(75) Inventor: Chuan-Ju Chen, Amberst, MA (US)

(73) Assignee: Bayer Antwerpen S.A./N.V., Antwerp (BE)

(*) Notice: Subject to any disclaimer, the term of this patent is extended or adjusted under 35 U.S.C. 154(b) by 0 days.

(21) Appl. No.: 09/029,326

(22) PCT Filed: Sep. 13, 1995

(86) PCT No.: PCT/US95/11617

§ 371 Date: Mar. 3, 1998

§ 102(e) Date: Mar. 3, 1998

(87) PCT Pub. No.: WO97/10301

PCT Pub. Date: Mar. 20, 1997

(51) Int. Cl.[7] ........................................ C08L 9/02
(52) U.S. Cl. ........................ 525/193; 525/206; 525/227; 525/233; 525/238; 525/241
(58) Field of Search ..................... 525/193, 206, 525/227, 233, 238, 241

(56) References Cited

U.S. PATENT DOCUMENTS

| | | |
|---|---|---|
| 3,489,821 | 1/1970 | Witt et al. . |
| 3,489,822 | 1/1970 | Witt et al. . |
| 4,127,617 | 11/1978 | Arrighetti et al. . |
| 4,145,378 | 3/1979 | Arrighetti et al. . |
| 4,801,646 | 1/1989 | Henton ................... 525/71 |
| 4,877,826 | 10/1989 | Beyer ..................... 524/377 |
| 4,904,730 * | 2/1990 | Moore et al. ............ 525/75 |
| 4,912,162 | 3/1990 | Kishida et al. .......... 525/67 |
| 4,946,894 | 8/1990 | Henton et al. .......... 525/71 |
| 5,112,895 | 5/1992 | Chen et al. ............. 524/308 |
| 5,397,836 * | 3/1995 | DeNicola, Jr. et al. ... 525/71 |
| 5,658,985 | 8/1997 | Eichenauer et al. ..... 525/83 |

FOREIGN PATENT DOCUMENTS

| | | |
|---|---|---|
| 283611 | 9/1988 | (EP) . |
| 0412370 * | 7/1991 | (EP) . |

* cited by examiner

Primary Examiner—Jeffrey C. Mullis
(74) Attorney, Agent, or Firm—Joseph C. Gil; Aron Preis

(57) ABSTRACT

A polymer composition comprising a blend of (a) a grafted olefin rubber, (b) an ungrafted olefin rubber, (c) a copolymeric matrix and an optional (d) a grafted acrylate rubber is disclosed. The composition which is characterized in having a desirable balance of impact strength and low gloss is useful for molding and extrusion of articles for certain outdoor applications.

8 Claims, No Drawings

LOW GLOSS WEATHERABLE POLYMER COMPOSITION

BACKGROUND OF THE INVENTION

Grafted rubber compositions are well known in the art. Poly(acrylonitrile butadiene styrene) or ABS is widely known and used as a molding and extrusion composition. In ABS, polybutadiene is grafted with acrylonitrile and styrene. For outdoor applications where the polymer composition is exposed to sunlight and weather, a saturated rubber such as polybutyl acrylate (PBA) polyethylene propylene (EP) or polyethylene propylene diene monomer (EPDM) is used in place of the butadiene used in ABS. Blends of these grafted saturated rubbers are also known.

1. Field of the Invention

The present invention is directed to a polymer composition which is a blend of (a) an olefin rubber such as ethylene propylene diene monomer rubber grafted with styrene and acrylonitrile (EPDM-g-SAN); (b) an ungrafted olefin rubber such as ethylene propylene diene monomer rubber (EPDM); (c) a poly(acrylonitrile styrene) matrix; and (d) optionally a butyl acrylate rubber grafted with styrene and acrylonitrile. These polymer compositions have a desirable balance of low gloss and impact strength which makes them especially suitable as molding and extrusion compounds for certain outdoor applications.

2. Description of Related Art

Butyl acrylate rubber and EPDM rubbers grafted with styrene and acrylonitrile are well known in the art. Such compositions are taught in U.S. Pat. No. 3,489,822 (Witt et al); U.S. Pat. No. 4,127,617 (Arrighetti et al); U.S. Pat. No. 4,145,378 (Arrighetti et al); and U.S. Pat. No. 4,912,162 (Kishida et al). Blends of a butyl acrylate rubber grafted with styrene and acrylonitrile (BA-g-SAN) and an EP or EPDM rubber grafted with styrene and acrylonitrile (EP-g-SAN or EPDM-g-SAN) are also well known and are taught in U.S. Pat. No. 4,877,826 (Beyer); U.S. Pat. No. 4,946,894 (Henton et al) and U.S. Pat. No. 5,112,895 (C. J. Chen and F. M. Peng).

SUMMARY OF THE INVENTION

The present invention is directed to molding and extrusion compositions which have low sheet gloss (less than 50 preferably less than 40 at a 60° angle) and good Izod impact (greater than 50 J/m). The compositions comprise (a) an olefin rubber grafted with a vinyl aromatic monomer and an unsaturated nitrile monomer and optionally one or more compatible comonomers; (b) an ungrafted olefin rubber; (c) an SAN matrix polymer; and (d) optionally an acrylate rubber grafted with vinyl aromatic monomer and an unsaturated nitrile monomer and optionally one or more compatible comonomers;

The EP and EPDM rubbers used in the present invention are well known in the art. Their description and a means for the preparation thereof have been disclosed in U.S. Pat. No. 3,489,821 and U.S. Pat. No. 4,202,948, both of which teachings are incorporated herein by reference. While a variety of alpha mono-olefins may be used in preparing EPDM rubbers, most desirably are those elastomers comprising a terpolymer of ethylene and propylene with an ethylenically unsaturated copolymerizable non-conjugated diene monomer. Illustrative non-limiting examples of suitable diene which may be used include dicyclopentadiene, ethylidene norbornene and 1,4-hexadiene.

Methods of preparing EPDM graft copolymers are also well known in the art. The graft copolymer is polymerized in the presence of the rubbery EPDM polymer utilizing either emulsion, suspension or solution polymerization techniques. Examples of EPDM graft copolymers are taught in U.S. Pat. Nos. 3,489,821, 3,489,822, 3,642,950 and 4,314,041 all of which are incorporated herein by reference. Preferred grafted EPDM rubbers have a weight average particle size from 0.1 $\mu$ to 1.0 $\mu$. Most preferred are those rubbers prepared by grafting the rubber spine in a solution or suspension process having a particle size of from 0.3 $\mu$ to 0.6 $\mu$.

Acrylate rubbers for use in the present invention are well known in the art and described, for example, in U.S. Pat. Nos. 3,830,878; 4,341,883; 3,944,631; 3691,260 and 4,224,419, the teachings of which are incorporated herein by reference. Preferred acrylate rubbers are crosslinked homopolymers of $C_{1-8}$ alkyl acrylates, especially butyl acrylate or 2-ethylhexyl acrylate, and crosslinked copolymers thereof with up to about 25 weight percent, preferably up to about 10 percent, of a copolymerizable comonomer. Suitable copolymerizable comonomers include monovinylidene aromatic monomers, e.g. styrene, alpha-methyl styrene, etc., acrylonitrile and alkyl methylacrylates such as methyl methacrylate. A preferred acrylate rubber comprises butyl acrylate optionally containing various di-and tri-vinyl substituted crosslinking and graft enhancing agents present in an amount up to about 5 percent by weight based on total rubber weight.

Preferably the acrylate rubber is prepared by an emulsion process. Emulsion polymerized acrylate rubbers may be partially agglomerated as is known in the art in order to provide a greater variety of particle size distribution in the resulting acrylate rubber product thereby controlling gloss and impact properties of the polymer. The rubber particles can also be grown to various sizes by varying the polymerization conditions and/or a mixture of previously prepared large and small seed particles may be employed to form the grafted rubber. The grafted acrylate rubber's weight average particle diameter is preferably from about 0.05 $\mu$ to about 0.5 $\mu$, most preferably from 0.1 $\mu$ to 0.25 $\mu$. Particle diameters are measured in the latex form of the rubber before grafting using techniques of transmission Electron Microscopy or hydrodynamic chromatography as disclosed in U.S. Pat. No. 4,419,496. Grafting of acrylate rubbers is also well known in the art and is disclosed, for example, in the above cited U.S. Pat. Nos. 3,830,878; 4,341,893; 3,944,631; 3,691,260 and 4,224,419. Preferably the crosslinked acrylate rubber is grafted by means of an emulsion process.

The amount of grafting in both the EPDM and acrylate rubbers may vary over a wide range. As defined by percent grafting (attached rigid phase weight/rubber weight×100) the percent graft may be from about 5 to about 150. Preferred percent grafting limits are from about 10 to 100. Desirable grafting levels are dependent on particle sizes. Large rubber particles generally possess lesser amounts of graft copolymer on a percentage basis. While it is preferred that each rubber substrate be grafted with a graft copolymer which is similar to the matrix resin, different copolymers may be employed for the various graft copolymers and matrix copolymer provided that these different copolymers are mutually compatible.

The matrix copolymer is typically prepared during the polymerization processes used to graft the EPDM and acrylate elastomers. Preferred are matrix copolymers comprising from 60 to 90% vinyl aromatic monomer, 10 to 40% nitrile monomer and 0 to 20 percent by weight of an acrylate, e.g. methylmethacrylate. More preferred matrix copolymers comprise 65 to 80% by weight styrene, 20 to 35% by weight acrylonitrile and 0 to 20% by weight of methylmethacrylate.

In addition to the matrix polymer formed during the grafting process, additional separately prepared compatible matrix polymer may be added to the compositions of this invention. Separately prepared matrix may be the same or different from the above described matrix formed during the grafting step.

The total amount of rubber in the blends is in the range of from 5 to 30% by weight based on the total weight of components (a), (b), (c) and (d). Preferably, when component (d) is not included, the total amount of rubber in the blend is in the range of from about 20 to about 30% by weight based on the total weight of components (a), (b) and (c). When all four components are present, the preferred amount of rubber is in the range of from about 10 to about 30% by weight.

By means of an appropriate selection of the rubber particle size, amount of crosslinking and the total amount of EPDM and acrylate rubber used in the polyblend, compositions having a wide variety of product properties may be prepared.

Stabilizers such as antioxidants and ultraviolet absorbers and hindered amine light stabilizers can also be added to the present compositions. Examples of antioxidants include the hindered phenolics, thioesters, phosphates and amine antioxidants. Suitable U.V. active stabilizers include the aromatic ketones, hydroxy ketones and esters, as well as other species that have U.V. absorption capability. Suitable hindered amine light stabilizers include Tinuvin 144, Tinuvin 770 and Cyasorb UV 3346. Flow aids, plasticizers, and lubricants can also be added to the present invention.

Having described in invention of the following examples are provided as further illustrative and are not to be construed as limiting.

DESCRIPTION OF THE PREFERRED EMBODIMENTS

The ungrafted EPDM component used in the working examples was Royalene IM-7100 supplied by Uniroyal Chemical Company.

The EPDM-g-SAN used in the working examples was Royaltuf 372 supplied by Uniroyal Chemical Company. It is further characterized as containing 50 by weight of EPDM rubber which is grafted with SAN in a S/AN weight ratio of 72/28. Other suitable EPDM and girfted EPDM rubbers are well known to those of ordinary skill in the art.

The separately prepared SAN matrix used was a copolymer containing about 68% by weight of styrene and about 32% by weight of acrylonitrile based on the total weight of the SAN copolymer.

The butylacrylate rubber grafted with styrene and acrylonitrile (BA-g-SAN) was prepared by polymerizing butyl acrylate to form a polybutylacrylate rubber using conventional emulsion polymerization. The rubber was crosslinked during polymerization such that the swelling index of the rubber in methyl ethyl ketone at 25° C. was about 10. The rubber was grafted by polymerizing a 70/30 weight ratio of styrene and acrylonitrile (120 parts total) in the presence of 100 parts of the rubber. The resulting grafted rubber had a weight average particle size diameter (Dw) of about 0.2 microns with a range of from about 0.08 to about 0.4 microns. The grafted rubber contained about 45% by weight of butyl acrylate and about 55S by weight of styrene acrylonitrile copolymer (SAN) present as grafted polymer and as free ungrafted matrix copolymer formed during the graft polymerization procedure.

Test Methods

1. Inverted Dart Impact (IDI)—A dart with a hemispherical head having a diameter of 0.013 meter was used, against which the specimen was driven at a constant speed of 3.39 meters/second. This is in accordance with the procedure set forth in ASTM D-3763 (specimen thickness was 2.54 mm, ring diameter was 31.75 mm). Results are expressed in Joules.

2. Izod Impact (J/m)—A falling pendulum with 163 Joules of energy at a velocity of 3.5 meters per second strikes a fixed specimen. The height of the pendulum swing after striking is a measure of the energy absorbed and thus indicates impact strength. Results are expressed in Joules/meter. This is in accordance with the procedures set forth in ASTM D-256.

3. Gloss was measured at 60 degrees using a Pacific Scientific Gloss-Grad II glossmeter. The ASTM D-523 procedure for specular gloss was used. To obtain the average gloss value, measurements were taken from three locations on an extruded sheet which measured 9.16 cm×59.96 cm.

Sample Preparation

The grafted and ungrafted rubber components, the SAN copolymer and additives were melt compounded using a Banbury Mixer followed by pelletizing. The resulting pellets were then molded and tested for Izod and IDI strength properties. For gloss measurement, the pellets were extruded into a 0.127 cm sheet using a 2.54 cm single screw extruder at 230° C.

EXAMPLES 1 TO 9

These examples are based on a blend of (a) an EPDM-g-SAN which contains 50% by weight of EPDM based on the total weight of the EPDM-g-SAN; (b) ungrafted EPDM; and (c) SAN matrix. The total amount of rubber in the examples varies from 25% by weight based on the total weight of (a), (b) and (c) in Examples 1 to 5 to 15% by weight in Examples 8 and 9. The results of the tests on these Examples are tabulated in Table I below.

TABLE I

SUMMARY OF EXAMPLES 1 TO 9

| Example (1) | 1 | 2 | 3 | 4 | 5 | 6 | 7 | 8 | 9 |
|---|---|---|---|---|---|---|---|---|---|
| EPDM | 0 | 6.25 | 12.5 | 18.75 | 25 | 0 | 10 | 0 | 7.5 |
| EPDM-g-SAN | 50 | 37.5 | 25.0 | 13.5 | 0 | 40 | 20 | 30 | 15.0 |
| SAN | 50 | 56.25 | 62.5 | 67.75 | 75 | 60 | 70 | 70 | 77.5 |
| % Rubber | | | | | | | | | |
| EPDM | 0 | 6.25 | 12.5 | 18.75 | 25 | 0 | 10 | 0 | 7.5 |
| EPDM-g-SAN | 25 | 18.75 | 12.5 | 6.25 | 0 | 20 | 10 | 15 | 7.5 |
| Ratio (2) | 0/25 | 1/3 | 1/1 | 3/1 | 25/0 | 0/20 | 1/1 | 0/15 | 1/1 |

TABLE I-continued

SUMMARY OF EXAMPLES 1 TO 9

| Example (1) | 1 | 2 | 3 | 4 | 5 | 6 | 7 | 8 | 9 |
|---|---|---|---|---|---|---|---|---|---|
| Total Rubber | 25 | 25 | 25 | 25 | 25 | 20 | 20 | 15 | 15 |
| Gloss | 71 | 28 | 23 | 24 | * | 68 | 37 | 75 | 60 |
| IDI, 23° C. | | | | | | | | | |
| Emax (J) | 17.4 | 13.1 | 6.7 | 1.2 | 0.6 | 17.8 | 5.0 | 18.4 | 2.1 |
| Efail (J) | 26.1 | 15.4 | 6.9 | 1.2 | 0.6 | 24.2 | 5.2 | 25.5 | 2.2 |
| Izod, 23° C. | | | | | | | | | |
| 1.27 × 0.32 cm (J/m) | 418.8 | 302.9 | 57.9 | 26.1 | 9.1 | 193.1 | 43.1 | 73.8 | 34.5 |
| 1.27 × 1.27 cm (J/m) | 513.1 | 244.4 | 59.5 | 28.2 | 11.0 | 234.6 | 51.6 | 142.4 | 41.0 |

(1) % by weight of components (a), (b) and (c)
(2) Ratio of % rubber in EPDM/% rubber in EPDM-g-SAN
*Sheet surface was very poor (rough surface).

Referring to Table I, Control Examples 1, 6 and 8 which do not contain an EPDM component have gloss values over 50. Control Example 5 which did not contain an EPDM-g-SAN component had a very poor surface. Examples 2 and 3 illustrate that at 25% by weight of total rubber and a weight ratio of EPDM/EPDM-g-SAN in the range of from 1/3 to 1/1 a material with a gloss less than 50 is obtained with an Izod impact greater than 50 J/m. Example 7, which contains 20% by weight of total rubber and an EPDM/EPDM-g-SAN weight ratio of 1/1 has low gloss (37) and an Izod of 51.6 J/m for the 1.27×1.27 cm sample. In Example 4, the weight ratio is 3/1 and in Izod values are low (26.1 and 28.2). In Example 9, the total amount of rubber is 15% by weight and the gloss is 60 and the Izod values are 34.5 and 41.0.

Examples 1 to 9 demonstrate that when using components (a), (b) and (c) without component (d) the total amount of rubber should be in the range of greater than 15% to about 30% and the weight ratio of EPDM/EPDM-g-SAN should be in the range of from about 3/1 to about 1/1.

EXAMPLES 10 TO 14

In these Examples, four component blends were prepared and tested as described above. The forth component is a butyl acrylate rubber which is grafted with a styrene acrylonitrile polymer (EA-g-SAN). The amount of butyl acrylate rubber in the BA-g-SAN component is 45% by weight based on the total weight of the BA-g-SAN. The EPDM-g-SAN component contains 50% by weight of EPDM based on the total weight of the EPDM-g-SAN. The results of the tests are tabulated in TABLE II below.

TABLE II

SUMMARY OF EXAMPLES 10 TO 16

| Example (1) | 10 | 11 | 12 | 13 | 14 | 15 | 16 |
|---|---|---|---|---|---|---|---|
| EPDM | 10 | 8.75 | 7.5 | 5.0 | 2.5 | 5.8 | 0 |
| EPDM-g-SAN | 0 | 2.5 | 5.0 | 10.0 | 15.0 | 23.4 | 20 |
| SAN | 56.7 | 55.45 | 54.2 | 51.7 | 49.2 | 54.1 | 46.7 |
| BA-g-SAN | 33.3 | 33.3 | 33.3 | 33.3 | 33.3 | 16.7 | 33.3 |
| % Rubber | | | | | | | |
| EPDM | 10 | 8.75 | 7.5 | 5.0 | 2.5 | 5.8 | 0 |
| EPDM-g-SAN | 0 | 1.25 | 2.5 | 5.0 | 7.5 | 11.7 | 10 |
| BA-g-SAN | 15 | 15 | 15 | 15 | 15 | 7.5 | 15 |
| Ratio (2) | 10/0 | 7/1 | 3/1 | 1/1 | 1/3 | 1/2 | 0/10 |
| Total Rubber | 25 | 25 | 25 | 25 | 25 | 25 | 25 |
| Gloss | * | * | 20 | 23 | 39 | 25 | 81 |
| IDI, 23° C. | | | | | | | |
| Emax. (J) | 1.6 | 2.5 | 10.5 | 18.2 | 17.6 | 16.0 | 19.5 |
| Efail (J) | 1.7 | 3.4 | 12.6 | 29.4 | 34.1 | 26.5 | 31.7 |
| Izod, 23° C. | | | | | | | |
| 1.27 × 0.32 cm (J/m) | 47.3 | 43.2 | 63.8 | 162.9 | 352.2 | 231.1 | 224.0 |
| 1.27 × 1.27 cm (J/m) | 47.2 | 45.2 | 62.2 | 124.8 | 179.7 | 128.6 | 216.8 |

(1) % by weight of components (a), (b), (c) and (d)
(2) ratio of % rubber in EPDM/% rubber in EPDM-g-SAN
*Sheet surface was very poor (rough surface)

Referring to Table II, Example 16, which illustrates the prior art compositions of BA-g-SAN and EPDM-g-SAN, has an Izod value of 216.8 but very high gloss level (81).

Example 10, which does not contain an EPDM-g-SAN component, has an Izod value of 47.2 and a very poor sheet surface appearance. In Examples 11 to 13, a portion of the EPDM rubber is replaced with EPDM-g-SAN. At levels of 1.25 parts of EPDM-g-SAN and 8.75 parts for EPDM (Example 11) the sheet surface appearance is poor and the Izod is 45.2. In Examples 12 and 13 the use of 2.5 and 5.0 parts of rubber from EPDM-g-SAN respectively provides a sheet with a good surface appearance and low gloss (20 and 23) and the Izod values increase to 62.2 and 124.8 respectively.

Examples 12 to 15 illustrate that when component (d) EA-g-SAN is present and the total weight percent of rubber is at 25%, the weight ratio of rubber in the EPDM and EPDM-g-SAN components may range from about 3/1 to about 1/3 and the resulting compositions still have a gloss below 50 and an Izod impact greater than 50 J/m.

The polyblends of the present invention may suitably be blended with other polymers to prepare useful molding resins. Examples of suitable other polymers are ABS, polycarbonates, polyaryl ethers, polysulfones, polyvinyl chloride, polymethylmethacrylate and the like.

What is claimed is:

1. A composition comprising:
   (a) an olefin rubber grafted with a vinyl aromatic monomer and an unsaturated nitrile monomer and optionally one or more compatible comonomers;
   (b) an ungrafted olefin rubber selected from the group consisting of EP rubbers and EPDM rubbers;

(c) a matrix polymer prepared from a vinyl aromatic monomer and an unsaturated nitrile monomer and optionally one or more compatible monomers; and (d) optionally an acrylate rubber grafted with a vinyl aromatic monomer and an unsaturated nitrile monomer and optionally one or more compatible comonomers;

wherein (c) is present in an amount of 49.2 to 70 percent relative to the weight of the composition and the total amount of rubber in the composition is in the range of from about 20% to about 30% by weight based on the total weight of the composition and wherein the weight ratio of the amount of rubber in component (b) and component (a) is in the range of from 1/3 to 1/1 with the proviso that when component (d) is present in the composition then the weight ratio of the amount of rubber in component (b) and component (a) is in the range of from 1/3 to 3/1 and the total amount of rubber in the composition is from about 5% to about 30% by weight and wherein the composition has a gloss value of less than 50 as determined by ASTM D-523 and an Izod impact value at 23° C. of greater than 50 J/m as determined on a sample 1.27 cm×1.27 cm as determined by ASTM D-256.

2. A composition as in claim 1 wherein component (a) is an EPDM rubber grafted with styrene and acrylonitrile.

3. A composition as in claim 1 wherein component (c) is a SAN copolymer containing from 5 to 40% by weight of acrylonitrile (AN).

4. A composition as in claim 3 which further contains a butyl acrylate rubber grafted with styrene and acrylonitrile and wherein from 2.5 to 25% by weight of the total rubber in the composition is butyl acrylate rubber.

5. A composition as in claim 2 wherein from 90 to 60 weight percent of styrene and from 10 to 40 weight percent of acrylonitrile based on the total weight of styrene and acrylonitrile is used in the graft on component (a).

6. A composition comprising:

(a) an olefin rubber grafted with a vinyl aromatic monomer and an unsaturated nitrile monomer and optionally one or more compatible comonomers;

(b) an ungrafted olefin rubber selected from the group consisting of EP rubbers and EPDM rubbers; and (c) a matrix polymer prepared from a vinyl aromatic monomer and an unsaturated nitrile monomer and optionally one or more compatible monomers;

wherein (c) is present in an amount of 49.2 to 70 percent relative to the weight of the composition and the total amount of rubber in the composition is in the range of from about 20% to about 30% by weight based on the total weight of the composition and wherein the weight ratio of the amount of rubber in component (b) and component (a) is in the range of from 1/3 to 1/1 wherein the composition has a gloss value of less than 50 as determined by ASTM D-523 and an Izod impact value at 23° C. of greater than 50 J/m as determined on a sample 1.27 cm×1.27 cm as determined by ASTM D-256.

7. A composition as in claim 6 where the olefin rubber used in component (a) is selected from the group consisting of EP and EPDM rubbers.

8. A composition comprising:

(a) an ethylene propylene diene monomer rubber grafted with a vinyl aromatic monomer and an unsaturated nitrile monomer and optionally one or more compatible comonomers;

(b) an ungrafted ethylene propylene diene monomer rubber;

(c) a matrix polymer prepared from a vinyl aromatic monomer and an unsaturated nitrile monomer and optionally one or more compatible monomers; and (d) a butyl acrylate rubber grafted with a vinyl aromatic monomer and an unsaturated nitrile monomer and optionally one or more compatible comonomers;

wherein (c) is present in an amount of 49.2 to 70 percent relative to the weight of the composition and the weight ratio of the amount of rubber in component (b) and component (a) is in the range of from 1/3 to 3/1 and the total amount of rubber in the composition is from about 5% to about 30% by weight and wherein the composition has a gloss value of less than 50 as determined by ASTM D-523 and an Izod impact value at 23° C. of greater than 50 J/m as determined on a sample 1.27 cm×1.27 cm as determined by ASTM D-256.

\* \* \* \* \*